Patented Apr. 11, 1939

2,153,584

UNITED STATES PATENT OFFICE 2,153,584

ADHESIVE

William Henry Moss, London, England, assignor to Celanese Corporation of America, a corporation of Delaware No Drawing. Application June 18, 1936, Serial No. 85,961. In Great Britain June 24, 1935

3 Claims. (Cl. 260—6)

This invention relates to improvements in or relating to the treatment of foils having a cellulose derivative basis and to compositions for use therein, and is more particularly concerned with a method of securing adhesion to the surfaces of films, foils, sheets and other articles made of such compositions.

The adhesion of films, foils, sheets and other articles made of compositions having a cellulose derivative basis to each other and likewise to articles of different composition is commonly effected with the aid of a solvent for the cellulose derivative. In many applications, however, the use of such solvents has objections, e. g. the toxicity, odour, or inflammability of the vapours of such solvents. Gelatine and glues having a basis of gelatine or similar proteid substance do not adhere satisfactorily to surfaces of articles made from compositions having a cellulose derivative basis, and especially a basis of organic esters of cellulose.

According to the present invention it has been found that very satisfactory adhesion between the surfaces of films, foils, sheets or other articles made of cellulose derivative compositions and articles of the same or different composition can be effected with the aid of an aqueous solution of gelatine containing a substance of high molecular weight, i. e. one containing at least 6 carbon atoms, which is somewhat hygroscopic or hydrophylic in nature and is compatible with gelatine. Sugars, e. g. cane sugar or glucose, have been found to be particularly suitable for use in this connection and the invention will be described more particularly with reference to compositions comprising gelatine and a sugar, while the resins described in co-pending U. S. application S. No. 67,149 filed March 4, 1936, possess the desired properties and may be used to replace part of the sugar in such compositions.

The following examples illustrate the production of the resins described in said application S. No. 67,149:—

Example 1

20.4 parts of methylene citric acid are heated with 6 parts of glycerol in an open vessel at 180° C. until a test sample gels when heated for 10 minutes at 185 to 190° C. in a glass tube in an oil bath. At this stage the product is yellow in color and is just hard at ordinary temperatures. The time taken to reach this stage is about 1 hour and 15 minutes.

Instead of using methylene citric acid and glycerol in this example, condensation may be effected between citric acid, glycerol, and paraformaldehyde.

Example 2

20 parts of citric acid and 9.2 parts of glycerol are condensed as in Example 1. The condensation product obtained is clear and colorless. In place of glycerol, glycol or formal glycerol may be employed and in place of citric acid, methylene citric acid, acetyl citric acid or tartaric acid may be employed, the proportions being substantially equimolecular.

In practice it has been found most advantageous that the adhesive should contain a considerably greater proportion of sugar than gelatine, for instance 10–18 and especially 13–15 parts by weight of sugar to each part of gelatine. The concentration in which the gelatine-sugar mixture is dissolved may correspond to about 10–17 parts by weight of water to each part of gelatine and may be varied according to the purpose to which the adhesive is to be put. Usually it is preferable to employ a gelatine-sugar solution of higher concentration when joining surfaces of articles made from cellulose derivative compositions than when joining the surface of such an article to that of an article made of paper, cardboard, or similar porous material not having a cellulose derivative basis. For instance, foils made of a composition having a basis of cellulose acetate can be caused to adhere to each other very effectively by means of an adhesive containing, for each part by weight of gelatine, 13–15 parts of cane sugar and 10–12 parts of water, while for sticking such a foil to paper an adhesive containing, for each part by weight of gelatine, 13–15 parts of sugar and 15–17 parts of water is very suitable.

The sugar in the above compositions may be replaced in part by one of the resins referred to above, for instance a water-soluble condensation product of methylene citric acid with glycerol; thus one to three quarters of the sugar may be replaced by resin.

It should be remarked that where the adhesive shows a tendency to set at ordinary temperatures, it may be applied to the surfaces to be joined while warmed, for instance to a temperature of 35–40° C. However, the solubility of the gelatine in cold water may be increased by a previous boiling or other hydrolytic treatment.

The adhesive of the invention may be stored, transported and supplied for use while in a dry condition, or in a concentrated form, sufficient water to produce a solution containing gelatine and sugar in the desired concentration being added before use, and the invention includes such dry or concentrated forms of the adhesive.

It will be appreciated that the ingredients of the adhesive of the present invention are such that the adhesive may be used in connection with the wrapping of foodstuffs in foils of compositions having a cellulose derivative basis, and the use of the adhesive in securing the folds of the foils in such wrapping operations, and likewise its use in securing paper to such foils, forms an important part of the present invention.

The invention is not, however, limited in this respect, but may be applied to other operations in which it is desired to effect adhesion to the surfaces of films, foils, sheets or other articles made of compositions having a cellulose derivative basis. For instance, in the manufacture of reinforced glass by laminating between two sheets of glass a layer of a thermoplastic composition having a cellulose derivative basis and sealing the edges of the product with a waterproof composition, it is usual to employ an adhesive between the surfaces of the sheets of glass and those of the layer of thermoplastic composition, e. g. by coating with an adhesive the surfaces of the glass which are to contact with the thermoplastic composition. It is possible to produce very satisfactory laminated glass by means of the adhesive of the present invention even with thermoplastic compositions having a basis of cellulose acetate, which are less readily secured to glass than are compositions having a basis of nitrocellulose. The present invention, in fact, is of particular importance in connection with compositions having a basis of cellulose acetate or other organic esters of cellulose, e. g. cellulose propionate or cellulose butyrate, but may also be employed in effecting adhesion to surfaces of articles having a basis of nitrocellulose and cellulose ethers, e. g. methyl cellulose, ethyl cellulose or benzyl cellulose.

The following are examples of the adhesive compositions of the invention but it is to be understood that these examples are given solely by way of illustration and are not limited:—

*Example 1*

9 parts by weight of gelatine and 124 parts by weight of sugar are dissolved in 140 parts by weight of water. The solution obtained, which sets at ordinary temperatures and should be used at about 35–40° C., is very suitable for effecting adhesion between a cellulose acetate foil and paper, cardboard or the like.

*Example 2*

9 parts by weight of gelatine and 124 parts by weight of sugar are dissolved in 100 parts by weight of water. The solution obtained is similar to that in Example 1 except that it is more suitable for use in effecting adhesion between cellulose acetate foils or between a cellulose acetate foil and another article having a basis of cellulose acetate.

In either of the above examples there may be used 62 parts by weight each of sugar and the methylene citric acid-glycerol resin described in Example 1 of U. S. application S. No. 67,149 filed March 4, 1936, in place of the 124 parts by weight of sugar.

Having described my invention, what I desire to secure by Letters Patent is:—

1. An adhesive for use with films, foils, sheets and other articles made of compositions having a cellulose derivative basis, which comprises gelatine, a sugar and a methylene citric acid-gylcerol resin, the weight of the sugar and resin together being 10–18 times the weight of the gelatine.

2. An adhesive for use with films, foils, sheets and other articles made of compositions having a cellulose derivative basis, which comprises 1 part by weight of gelatine, 2.5–13.5 parts by weight of sugar and 13.5–2.5 parts by weight of methylene citric acid-glycerol resin.

3. An adhesive for use with films, foils, sheets and other articles made of compositions having a cellulose acetate basis, which comprises 1 part by weight of gelatine, 3.25–11.25 parts by weight of sugar and 11.25–3.25 parts by weight of methylene citric acid-glycerol resin.

WILLIAM HENRY MOSS.